INVENTOR.
OTTO JABELMANN
BY Rodney Bedell
ATTORNEY.

Patented Nov. 11, 1941

2,262,004

UNITED STATES PATENT OFFICE 2,262,004

RAILWAY LOCOMOTIVE DRIVING WHEEL

Otto Jabelmann, Omaha, Nebr.

Application August 1, 1940, Serial No. 349,044

8 Claims. (Cl. 295—6)

The invention relates to the cross counterbalancing of locomotive driving wheels and the invention consists in all of the novel subject matter described below and illustrated in the accompanying drawing.

As is well known in the art it is necessary to provide a substantial weight on each wheel to counterbalance the weight of the connecting rod, pin and hub carried by that wheel, and it is also necessary on the main driving wheel to provide a weight to balance the out-of-plane action of the crank pin load on the wheel at the opposite end of the same axle.

It has been customary to combine the main counterbalance weight and the cross balance weight in a single mass of material, but in order to do this it is necessary to set the combined weight at an angle to the line through the crank pin and axle centers. Due to variation in molding and casting, it is often difficult to cast and machine wheels so that the proper angle is obtained to preserve the cross balance and main counterbalance values in a combined counterbalance weight. Obviously, when the main counterbalance and cross balance weights are so combined, it is not feasible to balance the axle and assembled wheels statically and then to add the cross balance weights.

The main object of the present invention is to obtain a simple, effective, secure cross balancing distinct and applied separately from the main counterbalance.

Preferably the cross balance counterweight is formed by adding loose material to a relatively small pocket-like member after which a cover plate is applied over the material and welded to the member.

It is a further object of the present invention to adapt the relatively small pocket-forming member to receive the cover and have it welded thereto without setting up objectionably high strains in the member or the wheel.

These and other detailed objects of the invention are attained by the illustrative structure shown in the accompanying drawing in which—

Figure 1:
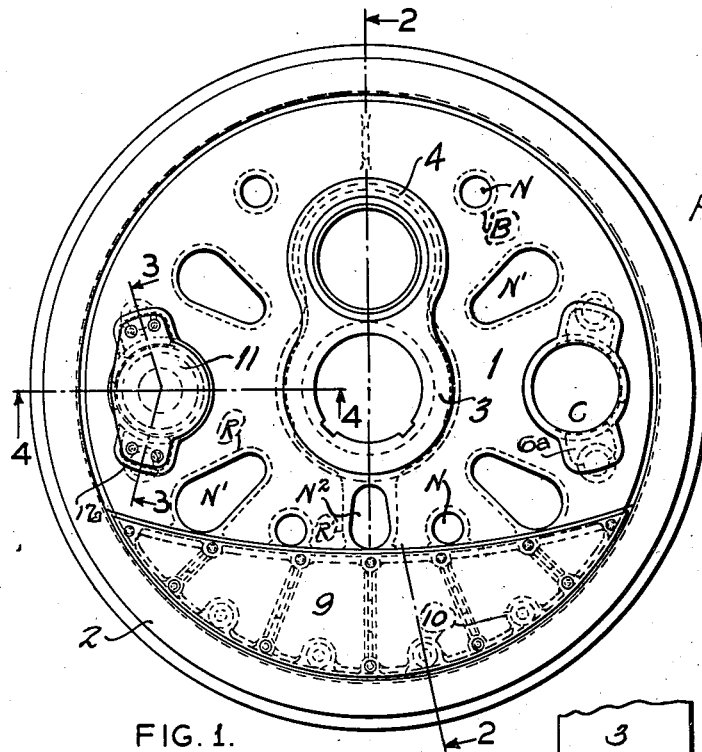
Figure 1 is a side elevation of a locomotive driving wheel.

The wheel illustrated in Figure 1 comprises a cast center 1 and a separately formed rim or tire 2 shrunk on to the wheel center although, so far as the present invention is involved, the tire may be cast integral with the body of the wheel. The wheel center has a central portion of substantially solid section forming the hubs 3 and 4 for the axle, indicated at A, and for the crank pin, indicated at P.

Figure 2:
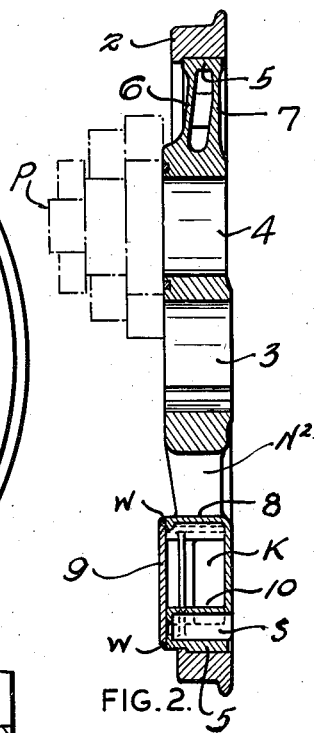
Figure 2 is a vertical transverse section taken on the line 2—2 of Figure 1.
Figure 5:
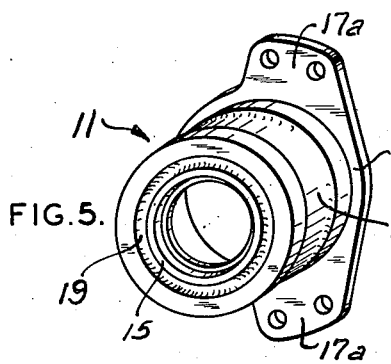
Figure 5 is a perspective view of the cross balance pocket member formed separately from but applied to and constituting a part of the complete wheel unit.
Figure 4:
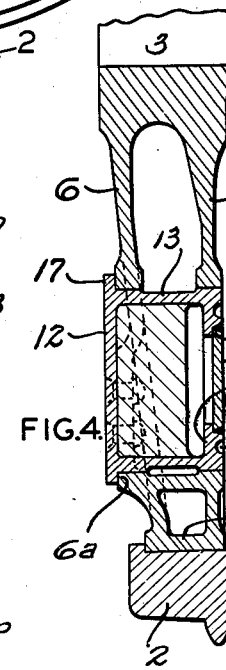
Figure 4 is a detail horizontal section taken on the line 4—4 of Figure 1.
Figure 3:
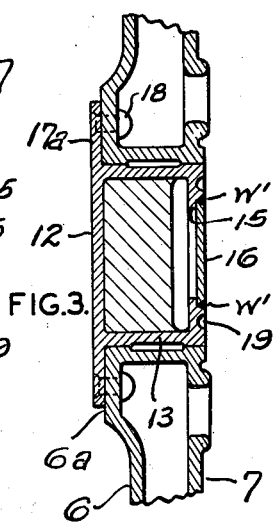
Figure 3 is a detail vertical transverse section taken on the line 3—3 of Figure 1.

The wheel center has a substantially box-like section surrounding hubs 3 and 4 and including the outer wall 5, front wall 6, rear wall 7, the inner wall of the section being formed by the periphery of hubs 3 and 4. Adjacent the lower portion of the wheel, as it stands in Figures 1 and 2, a portion of front wall 6 is removed and the adjacent portions of outer wall 5, rear wall 7 and a transverse web 8 cooperate to form a pocket K for counterbalance material which, after being applied, is retained by the cover plate 9 welded, as indicated at W, to the edges of the pocket forming elements.

Figure 6:
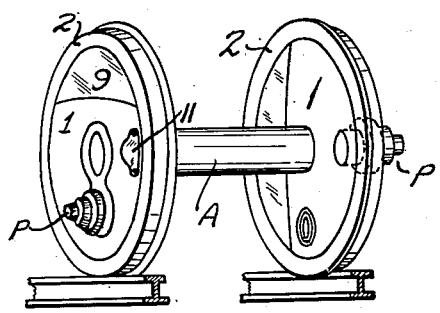
Figure 6 is a view showing the complete wheels and axle assembly and the relative positions of the counterbalance and cross balance counterweights.

A series of recesses S are formed in the lower portion of the wheel by arcuate webs 10 and these form spaced pockets into which loose material may be inserted as required in statically balancing the assembled unit shown in Figure 6. Walls 6 and 7 are provided with other openings N, the edges of which are reenforced by beads B, and openings N' and N² at which ribs R and R' extend transversely of the wheel. These openings lighten the wheel somewhat and facilitate mounting and casting operations without detracting unduly from the necessary strength of the wheel.

All of the above described parts are known in the art and in themselves do not constitute the present invention.

Front and rear walls 6 and 7 also have symmetrically aligned circular openings C into one of which a cross balance pocket member 11 may be inserted after the wheels and axle unit has been balanced statically.

Pocket member 11 is substantially cup-shaped and has a bottom wall 12, a circular side wall 13 and an inturned flange 14 extending inwardly a substantial distance from wall 13 and terminating in a circular ledge 15 for seating a cover plate 16 which, after the required amount of material has been placed in the pocket, may be welded, as indicated at W', to flange 14. The amount of such material may be calculated or predetermined prior to the application of the closure plate and the application of the pocket member to the wheel.

Flange 14 has a circular recess 19 spaced from its inner edge, and this recess avoids undue transmission of heat to the side wall of the pocket member and thereby prevents distortion due to expansion and contraction of the flange and cover plate during and after the welding operation and thereby also avoids strain in the adjacent portions of the wheel casting after the pocket member is applied thereto.

Bottom wall 12 extends laterally beyond the face of side wall 13 to form a flange 17 disposed to engage the opposing portion 6a of the wheel front wall. Pocket member 11 has a press fit in the corresponding wheel opening S and flange 17 limits the movement of the pocket member into the wheel. Portions of flange 17 are enlarged, as indicated at 17a, to provide ears to take rivets 18 whereby the pocket member is held in position on the wheel.

The unitary formation of the complete pocket member with the loose material applied therein and the provision of elevations 6a on the wheel front wall provide simple, effective means for applying the cross balance counterweight to the wheel after the wheel has been otherwise completed and statically balanced in the unit shown in Figure 6.

The circular wall of the cross balance pocket member and the circular opening therefor in the wheel walls are readily machined to provide for the drive fit, and the flanges on the pocket member and the faces of the wheel wall engaged thereby are readily machined for accommodating the riveting of the pocket member flange to the wheel wall. By this construction the pocket member is held riveted with the driving wheel and easily resists any tendencies of the pocket member becoming loose due to centrifugal forces set up by its weight during rotation of its wheel at high speeds.

While the details of the construction described and illustrated provide a satisfactory structure attaining the objectives referred to above, it is to be understood that the details may be varied substantially without departing from the spirit of the invention, and the exclusive use of such modifications coming within the scope of the claims is contemplated.

What is claimed is:

1. In a locomotive driving wheel, hub structure for the axle and for its crank pin, a counterbalance for said hub structure and a crank pin carried thereby, a wall extending radially from said hub structure, and a cross balance formed and applied to said wall separately from said counterbalance, said cross balance including a pocket member fitting within an opening provided therefor in said wall and having a laterally extending flange overlying the wall whereby the pocket member may be secured to the wheel through said wall outwardly from the body of said member.

2. In a locomotive driving wheel, hub structure for the axle and for its crank pin, a counterbalance for said hub structure and a crank pin carried thereby, a wall extending radially from said hub structure, and a cross balance formed and applied to said wall separately from said counterbalance, said cross balance including a pocket member having a cylindrical side wall and fitting within an opening provided therefor in said wheel wall and having an outturned flange overlying the wheel wall, said flange being enlarged to form ears through which said member may be riveted to said wheel wall.

3. In a locomotive driving wheel, hub structure of substantially solid section provided with openings for the axle and for its crank pin, front and rear walls extending radially from said hub, a counterbalance for said hub structure and a crank pin carried thereby, there being aligned openings in said walls spaced from said counterbalance, a cross balance formed and applied to said walls separately from said counterbalance, said cross balance comprising a cup-like member extending between said walls and fitting in said openings and provided with an ear overlapping the exterior face of one of said walls, and rivets through said ear and wall securing said pocket member in place.

4. In a locomotive driving wheel, hub structure of substantially solid section provided with openings for the axle and for its crank pin, front and rear walls extending radially from said hub, a counterbalance for said hub structure and the crank pin carried thereby, there being aligned openings in said walls spaced from said counterbalance, a cross balance formed and applied to said walls separately from said counterbalance, said cross balance comprising a cup-like member extending between said walls and fitting in said openings and being provided with a circular flange overlying one of said walls and having enlarged portions forming spaced ears for receiving rivets extending through said wall to hold the cross balance in position.

5. In a locomotive driving wheel, hub structure of substantially solid section provided with openings for the axle and for its crank pin, front and rear walls extending radially from said hub, a counterbalance for said hub structure and the crank pin carried thereby, there being aligned openings in said walls spaced from said counterbalance, a cross balance formed and applied to said walls separately from said counterbalance, said cross balance comprising a cup-like member extending between said walls and fitting in said openings and having a bottom wall at one end and a cover plate at the other end, said bottom wall being extended beyond the side of the pocket member to form a flange which engages one of the wheel walls to position the top wall of the pocket member flush with the other wheel wall, there being means for securing said pocket member bottom wall to the adjacent wheel wall.

6. A locomotive driving wheel cross balance pocket member comprising a cup-like structure with a bottom wall and a side wall having an inturned flange spaced from said bottom wall and forming a seat for a cover plate, said flange being recessed between said seat and said side wall to provide a thinner flange area accommodating distortion of the flange when the cover plate is welded to said seat.

7. A pocket member for application to a locomotive driving wheel and comprising a cup-like structure with a cylindrical side wall having a flange extending inwardly and recessed to form a shouldered seat, a balance material retaining plate welded to said flange, the thickness of said flange being reduced between said wall and the weld to better accommodate distortion of said flange when subjected to welding temperatures and to hinder the transmission of the heat of welding to said wall and the adjacent portion of the wheel.

8. In a locomotive driving wheel, a hub section, a rim section, a relatively thin web between said sections and provided with an opening, a pocket member arranged to receive balance weight material and having a side wall surrounded by and fitting tightly against the edge of said opening and having an inwardly extending flange forming a seat spaced substantially from said wall, a material retaining plate with its edge portion welded to said seat, said flange being thinned between said plate edge portion and the welding material applied thereto and said side wall to limit the transmission of heat from the welding operation to said wall and web and thereby avoid setting up undesirable strains in said web.

OTTO JABELMANN.